United States Patent [19]

Kmiec et al.

[11] Patent Number: 4,607,060
[45] Date of Patent: Aug. 19, 1986

[54] FOAMING AND CROSSLINKING OF ELASTOMERIC AND/OR THERMOPLASTIC POLYMERS

[75] Inventors: Chester J. Kmiec, Amherst; Michael F. Novits, Buffalo; Edward P. Hibbard, Cheektowaga, all of N.Y.

[73] Assignee: Pennwalt Corporation, Philadelphia, Pa.

[21] Appl. No.: 782,250

[22] Filed: Sep. 30, 1985

[51] Int. Cl.$^4$ ................................................ C08J 9/10
[52] U.S. Cl. .......................................... 521/89; 521/91; 521/92; 521/95; 521/96; 521/143; 521/144; 521/149; 521/150; 521/154
[58] Field of Search ................... 521/138, 96, 95, 154, 521/143, 149, 144, 89, 91, 92

[56] References Cited

U.S. PATENT DOCUMENTS

| 4,322,502 | 3/1982 | Stott et al. | 521/138 |
|---|---|---|---|
| 4,393,148 | 7/1983 | Kamens | 521/96 |
| 4,397,965 | 8/1983 | Stott | 521/138 |
| 4,435,525 | 3/1984 | Kamens | 521/92 |

*Primary Examiner*—Morton Foelak

[57] ABSTRACT

Crosslinked elastomeric and/or thermoplastic closed-cell foams having low densities are prepared from an admixture which comprises a crosslinkable thermoplastic and/or elastomeric polymer, a free radical initiator which is activated at temperatures from about 50° C. to about 350° C., and a t-alkylhydrazinium salt or a carbonylhydrazine.

8 Claims, No Drawings

FOAMING AND CROSSLINKING OF ELASTOMERIC AND/OR THERMOPLASTIC POLYMERS

BACKGROUND OF THE INVENTION

This invention is related to the foaming and crosslinking of elastomeric and/or thermoplastic polymers at elevated temperatures using a t-alkylhydrazinium salt or a carbonylhydrazine with a free radical initiator.

Prior to the present invention there existed the need to balance the decomposition of the blowing agent to the decomposition of the initiator in order to obtain good quality crosslinked foamed products using the prior art organic peroxide initiators and chemical blowing agents systems for crosslinking and foaming elastomeric or thermoplastic polymers. If this balance is not maintained, a significant amount of the initiator may decompose prior to gas generation from the blowing agent, thus generally producing a product with very little foaming having coarse and nonuniform cell size. If the blowing agent significantly decomposes prior to the initiator decomposition, on the other hand, the resulting product will have a collapsed foam structure. In the prior art systems both the crosslinking agent and blowing agent functioned independently.

The foaming and crosslinking (or curing) of polymeric resins are well known in the prior art. U.S. Pat. No. 4,393,148 discloses the foaming and curing of an unsaturated polyester resin at ambient temperatures using a peroxide curing agent, an iron or copper metal salt promoter, and a t-alkylhydrazinium salt as a blowing agent. U.S. Pat. No. 4,435,525 discloses the foaming and curing of an unsaturated polyester resin at ambient temperatures using a peroxide curing agent, an iron or copper metal salt promoter, and a carbonylhydrazine as a blowing agent. Published European patent application no. 0048050 discloses the foaming and curing of an unsaturated polyester resin using a peroxide curing agent, an organometallic salt promoter, and a t-alkylhydrazine blowing agent. None of these references discloses the present invention.

SUMMARY OF THE INVENTION

The present invention is directed to a foamable and crosslinkable composition consisting essentially of a crosslinkable thermoplastic and/or elastomeric polymer, a free radical initiator which is activated at temperatures from about 50° C. to about 350° C. and a t-alkylhydrazinium salt or a carbonylhydrazine.

This invention also comprehends a process of foaming and crosslinking the above mentioned compositions to produce crosslinked, foamed structures having uniform cellular structures and which process eliminate the need to carefully balance the cure rate and rate of gas generation in order to produce high quality foamed products.

DETAILED DESCRIPTION OF THE INVENTION

It has now been found that the gas needed for expansion of an elastomeric or thermoplastic polymer is obtained from a reaction between the t-alkylhydrazinium salt and/or carbonylhydrazine and a free radical source selected from organic peroxide or azo initiator, thus eliminating the need for balancing the cure to the expansion. The foam/sponge process is, therefore governed by the free radical source.

Initiator requirements can and will vary from application to application; however, the basic concepts of initiator selection such as half-life temperature, cure time, and scorch time will still have to be considered in determining a particular application but with much more flexibility.

POLYMERIC COMPOUNDS

The polymeric compounds encompassed in the present invention are those defined as natural or synthetic materials which are thermoplastic or elastomeric in nature and which can be crosslinked through the action of a free radical initiator (crosslinking agent). Reference can be made to Rubber World "Elastomers Crosslinked with Diperoxyketals", October 1983 and Rubber and Plastics News "Organic Peroxides for Rubber Crosslinking" Sept. 29, 1980 as to the crosslinking action and crosslinkable polymers. For the process of this invention these polymeric compounds include materials such as: ethylene-propylene terpolymers, ethylene-propylene co-polymers, silicone rubber, nitrile rubber, neoprene, chlorinated polyethylene, fluoroelastomers, polybutadiene, chloro-sulfonated polyethylene, ethylene-vinyl acetate, low density polyethylene, linear low density polyethylene, and high density polyethylene.

In addition, blends of two or more of these materials can be incorporated into the process of this invention.

t-ALKYLHYDRAZINIUM SALTS AND CARBONYLHYDRAZINES

The hydrazine derived compounds which are useful in the process of the instant invention are t-alkylhydrazinium salts having the following general structure

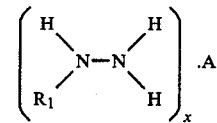

where x is 1, 2, 3 or 4 and A is an inorganic or organic acid; when x is 1, A is a monoprotic acid; when x is 2, A is a diprotic acid; when x is 3, A is a triprotic acid; and when x is 4, A is a terprotic acid. $R_1$ is a tertiary alkyl of 4 to 8 carbons.

Examples of t-alkylhydrazinium salt blowing agents include the following: di-t-butylhydrazinium sulfate, t-butylhydrazinium bisulfate, t-butylhydrazinium chloride, mono-t-butylhydrazinium phosphate, t-butylhydrazinium benzoate, t-butylhydrazinium acetate, di-t-butylhydrazinium succinate, t-butylhydrazinium di-(2-ethylhexyl)phosphate, mono-t-butylhydrazinium oxalate, di-t-butylhydrazinium oxalate, t-butylhydrazinium neodecanoate, di-t-butylhydrazinium azelate, t-butylhydrazinium pivalate, t-butylhydrazinium p-toluenesulfonate, t-butylhydrazinium methanesulfonate, t-butylhydrazinium sulfonate, tetra-t-butylhydrazinium 1,2,4,5 benzenetetracarboxylate, di-t-butylhydrazinium terephthalate, mono t-butylhydrazinium dipicolinate, di-t-butylhydrazinium carbonate, t-butylhydrazinium sodium sulfate, t-butylhydrazinium malate, t-butylhydrazinium tributyl sulfate, t-amylhydrazinium chloride and di(t-butylhydrazinium)isophthalate.

Two of the most preferred compounds are t-butylhydrazinium chloride (t-BZ.HCl) and di-t-butylhydrazinium sulfate [(t-BZ)$_2$.H$_2$SO$_4$].

Carbonylhydrazines also useful in this invention have the following general structure:

where X is selected from R$_2$O—, R$_3$,

and H$_2$NNH—; R$_2$ can be alkyl of 1 to 20 carbons, cycloalkyl of 5 to 12 carbons, aralkyl of 7 to 18 carbons, aryl of 6 to 18 carbons, alkenyl of 2 to 20 carbons, alkynyl of 2 to 20 carbons, or a 5 or 6 membered heterocyclic ring containing a nitrogen, sulfur, or oxygen atom in the ring. R$_3$ can be independently defined as R$_2$ or hydrogen; R$_4$ can be a covalent bond or a diradical selected from alkylene of 1 to 16 carbons, alkenylene of 2 to 16 carbons, alkynylene of 2 to 16 carbons, cycloalkylene of 5 to 16 carbons, arylene of 6 to 18 carbons, or aralkylene of 7 to 18 carbons; each of R$_2$, R$_3$ and R$_4$ can be branched or unbranched and optionally substituted with lower alkoxy, nitro, halogen, cyano, carboxy, hydroxy, lower acyloxy, aroyloxy, sulfo, lower alkoxycarbonyl, lower alkoxycarbonyloxy, N-substituted or unsubstituted carbamoyl and carbamoyloxy, lower thioalkoxy, lower thioacyloxy, lower dithioacyloxy, lower thioalkoxycarbonyl, lower dithioalkoxycarbonyl, lower thioalkoxycarbonyloxy, lower acyl, aroyl, and lower alkylsulfonato where lower alkyl includes 1 to 6 carbons; and R$_4$ can optionally contain connective groups in the diradical backbone selected from the group consisting of

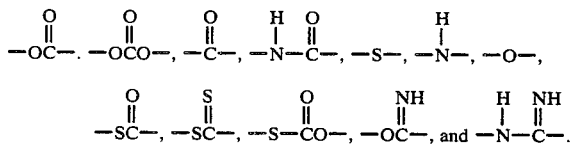

Examples of carbonylhydrazine compounds of this invention include the following:

(1) Acid hydrazines such as formic, acetic, propionic, hexanoic, oleic, lauric, stearic, benzoic, toluic, furoic, eicosanoic, phenylacetic, cinnamic, mandelic, dihydrocinnamic, acetylsalicyclic, anthranilic, nitrobenzoic, chlorobenzoic, sulfobenzoic, thenoic, nicotinic, naphthoic, and crotonic hydrazide;

(2) dibasic acid dihydrazides such as oxalic, malonic, succinic, glutaric, adipic, pimelic, suberic, azelaic, sebacic, maleic, fumaric, citraconic, phthalic, isophthalic, terephthalic, and tartaric dihydrazide;

(3) carbazates such as methyl, ethyl, proply, isopropyl, t-butyl, sec.-butyl, isobutyl, n-butyl, hexyl, octyl, decyl, hexadecyl, octadecyl, benzyl, phenethyl, octenyl, allyl, cyclohexyl, cyclopentyl, phenyl, naphthyl, thenyl, furyl and propynyl carbazate; and (4) carbohydrazide.

The preferred carbonylhydrazine compounds are 2-furoic acid hydrazide, acetylhydrazine, toluic acid hydrazide, succinic acid hydrazide, adipic acid dihydrazide, carbohydrazide, t-butyl carbazate, and ethyl carbazate.

For elastomeric or thermoplastic polymers preblending the t-alkylhydrazinium salts and/or carbonylhydrazines with plasticizers or processing oils can be (but not necessarily has to be) done to facilitate mixing into the polymer. Generally, the amount of these compounds can be varied over a relatively wide range to achieve desired foam densities; however, they are typically used in amounts ranging from 0.1 to 20 phr and preferably from about 0.2 to 10 phr. Generally, the particle size of the t-alkylhydrazinium salt and/or carbonylhydrazine can be varied over a wide range to achieve the desired cellular product. A particle size range of from about 1.0 micron to about 100 microns, preferably from about 2.0 microns to about 75 microns, is desired. t-Alkylhydrazinium salts and/or carbonylhydrazine can also be incorporated as masterbatches in suitable carrier.

INITIATORS

In accordance with the present invention compounds such as organic peroxides and/or azo initiators, which upon thermal decomposition generate free radicals may be employed. Of all of the free radical initiators used as crosslinking agents, the dialkyl and diperoxyketal initiators are preferred. A detailed description of these compounds can be found in the "Encyclopedia of Chemical Technology", Third Edition, Vol 17, pp 27-90. The preferred dialkyl peroxide initiators are dicumyl peroxide, di-t-butyl peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3, 2,5-dimethyl-2,5-di-(t-amylperoxy)hexyne-3, α,α-di[(t-butylperoxy)-isopropyl]benzene, di-t-amyl peroxide, and 1,3,5-tri[(t-butylperoxy)isopropyl]benzene.

The preferred diperoxyketal initiators are 1,1-di(t-butylperoxy)-3,3,5-trimethylcyclohexane, 1,1-di(t-butylperoxy)cyclohexane, n-butyl 4,4-di-(t-butylperoxy)valerate, ethyl 3,3-di(t-amylperoxy)butyrate, 2,2-di(t-amylperoxy)propane, 6,6,9,9-tetramethyl-3-methyl-3, n-butyl 1,2,4,5-tetraoxycyclononane, and 6,6,9,9-tetramethyl 3-methyl-3-ethylcarbonylmethyl-1,2,4,5-tetraoxycyclononane.

Mixtures of two or more free radical initiators may be employed within the scope of this invention.

The amount of crosslinking agent present in the composition of this invention has to be sufficient to afford the desired degree of crosslinking. The amount of peroxide can range from 0.1 to 10 parts by weight for each 100 parts by weight of polymeric compound. Preferably, 0.5 to 5.0 parts by weight per 100 parts by weight of polymeric compound can be used.

ADDITIVE TO MEDIUM

The gas-generating compositions of the present invention may also be used in combination with current commercial blowing agents such as azodicarbonamide, p-toluenesulfonylhydrazide, 4,4-oxybis(benzenesulfonylhydrazide), dinitrosopentamethylenetetramine, and 5-phenyltetrazole.

The crosslinkable-foamable compositions of the present invention may include fillers such as carbon black, titanium dioxide, alkaline earth metal carbonates, and co-agents such as triallylcyanurate, triallylisocyanurate, various methacrylate and acrylate compounds and metal oxides such as zinc oxide and magnesium oxide.

The composition of the present invention may also contain antioxidants, stabilizers, plasticizers and processing oils. Co-vulcanization involving sulfur cures along with organic peroxides, known in the art, can be used in the practice of this invention.

PROCESS CONDITIONS

Generally crosslinking temperatures are within the range of 50° C. to 350° C., preferably 75° C. to 250° C. The time necessary for crosslinking and expansion can vary within the general range of 30 seconds to 2 hours, more preferably 1 minute to 90 minutes.

When one of these compositions for producing cellular bodies is heated to effectuate crosslinking/expansion, it will be apprieciated that the fluidity and related characteristics of the composition must be such as to accommodate the gas evolved while retaining the cellular structure. In the practice of this invention open or closed molds may be used in conjunction with known processing methods such as low pressure molding, high pressure molding, or continuous extrusion.

EXAMPLES

Standard Experimental Procedure

Compounding

All formulations were compounded using the C. W. Brabender Plastograph mixer with roller-5 type mixing blades. The mixer was at ambient temperature (no preheating) unless otherwise specified in the specific example. The components such as carbon black, calcium carbonate, amorphous silicon dioxide, zinc oxide, processing oil, and other additives as may be indicated in the specific examples were weighed at the desired parts by weight of elastomer into a 3-ounce waxed paper cup and mixed using a small metal spatula. The gas-generating components, organic peroxide and t-alkylhydrazinium salt and/or carbonylhydrazine were then weighed at the desired parts by weight polymer into the waxed paper cup and mixed using a small metal spatula. The specific parts per 100 parts of polymer are listed in each example.

100 parts by weight of polymer were fluxed in the C. W. Brabender Plastograph at the mixing speed designated in the appropriate examples. The contents of the cup were then slowly added to the fluxing polymer. The composition was allowed to mix for three (3) minutes. The entire composition was then removed from the mixer and subsequently pressed into a flat plaque (no specific thickness) using a room temperature Carver Laboratory Press (Model C). The flat sheet was then allowed to cool to room temperature.

Crosslinking/Expansion Procedure

The specific cure temperature and cure time for each composition is detailed in the appropriate example; otherwise, the following procedure was used to produce the polymer foam or sponges. A Carver Laboratory Press (Model C) was preheated to the desired temperature along with a 5.0"×5.0"×0.25" mold with a 0.125" thick insert. Enough of the specific compounded composition was used to completely fill the mold cavity under low pressure. The low pressure was applied for 30-60 sec. The pressure was then released completely and the sponge was allowed to rise and cure.

Equilibrium Water Absorbtion Procedure

An equilibrium water absorption procedure was used to determine closed cell content of sponges of the present invention. The procedure consisted of first calculating the volume of a sponge and non-sponge sample using the density of the material. By subtracting the volume of the non-foam sample from the foamed sample the volume of gas in the sponge was obtained. The preweighed sponge sample with four exposed sides of the core was immersed in a closed glass jar of water for seven (7) days at ambient temperature. The starting weight was then subtracted from the final seven (7) day weight yielding the amount of water absorbed by the sponge. The volume of water absorbed was then divided by the gas volume. This value was then multiplied by one hundred (100) to obtain percent open cells. This value was subtracted from one hundred (100) percent to obtain percent closed cells.

EXAMPLE 1

This example illustrates the effectiveness of using a gas generating composition of the present invention in producing a crosslinked EPDM sponge. The mixing speed was 30 rpm, the cure temperature was 149° C., and the cure time was 15 minutes. The standard mixing and sponge producing procedures were followed.

TABLE I

| Compositions | (Parts by Weight) | | |
| --- | --- | --- | --- |
| | A | B | C |
| Polysar 346 EPDM[a] | 100 | 100 | 100 |
| N-539[b] | 40 | 40 | 40 |
| Atomite 319[c] | 40 | 40 | 40 |
| Sunpar 2280[d] | 30 | 30 | 30 |
| Luperco 231-XL[e] | — | — | 6.0 |
| t-Butylhydrazinium chloride (55% in Santicizer 711) | — | 1.82 | 1.82 |
| Density (lbs/ft$^3$) | 54.5 | 57.0 | 31.2 |

[a]ethylene-propylene-diene (EPDM) rubber with a specific gravity of 0.86 and a Mooney Viscosity (ML1 + 8(100° C.)) of 27-30 from Polysar Inc.
[b]FEF-LS carbon black from Cabot Corp.
[c]calcium carbonate from Thompson, Weinman & Co.
[d]paraffinic oil from Sun Refining and Marketing Co.
[e]1,1-bis(t-butylperoxy)-3,3,5-trimethylcyclohexane, 40% active on inert filler, from Pennwalt Corp.

Columns A and B show comparative tests. Upon visual inspection, the processed sample of Column B was similar in appearance to the Column A sample. Densities of A and B were of the same order of magnitude, indicating that the t-butylhydrazinium chloride did not show evidence of yielding a foam structure.

When the t-butylhydrazinium chloride and organic peroxide were used in combination (Column C), the density significantly decreased and a sponge with a fine uniform cellular structure (upon visual inspection) was produced. Using the equilibrium water absorption method described in the standard experimental procedure, the closed cell content of the resulting sponge of Column C was determined to be 92%.

A sample containing the ingredients of Column A plus the organic peroxide (Luperco 231-XL) was also prepared and processed under similar conditions. Visual inspection of this sample showed random voids within the sample.

EXAMPLE 2

This example illustrates t-butylhydrazinium chloride in combination with different organic peroxides in producing a crosslinked silicone sponge. The organic peroxides have significantly different 10-hour half-life temperatures. The standard mixing and sponge producing procedures were followed. The mixing speed was 50 rpm. The cure temperature was 177° C. and the cure time for Column A was 7 minutes and for Columns B and C, the cure time was 10 minutes.

TABLE II

| Compositions | (Parts by Weight) | | |
|---|---|---|---|
| | A | B | C |
| SPG-30 Silicone Rubber* | 100 | 100 | 100 |
| Hi-Sil 233[a] | 3.0 | 3.0 | 3.0 |
| Lupersol 231[b] | 1.57 | — | — |
| Luperox 500R[c] | — | 2.72 | — |
| Lupersol 101[d] | — | — | 1.58 |
| t-Butylhydrazinium chloride (60% in silicone fluid) | 5.0 | 5.0 | 5.0 |
| Density (lbs./ft$^3$) | 44.9 | 35.2 | 35.4 |

*type:PMQ (ASTM D-1418) from Dow Corning Co.
[a]precipitated silica powder from PPG Industries, Inc.
[b]1,1-bis(t-butylperoxy)-3,3,5-trimethyl cyclohexane from Pennwalt Corp.
[c]dicumyl peroxide from Pennwalt Corp.
[d]2,5-dimethyl-2,5-di(t-butylperoxy)hexane from Pennwalt Corp.

Sponges with a fine uniform cellular structure (upon visual inspection) were obtained.

EXAMPLE 3

This example compares the effectiveness of gas-generating composition of the present invention to prior art blowing agents in producing a crosslinked silicone sponge.

The standard mixing and sponge producing procedures were followed. The mixing speed was 50 rpm. The cure temperature and cure time were 177° C. and 15 minutes.

TABLE III

| Compositions | (Parts by Weight) | | | |
|---|---|---|---|---|
| | A | B | C | D |
| SPG-30 Silicone Rubber | 100 | 100 | 100 | 100 |
| Hi-Sil 233 | 3.0 | 3.0 | 3.0 | 3.0 |
| Luperox 500R | 2.52 | 2.52 | 2.52 | 2.52 |
| Luperco CST[a] | 1.0 | 1.0 | 1.0 | 1.0 |
| Rodo No. 10[b] | 0.1 | 0.1 | 0.1 | 0.1 |
| t-Butylhydrazinium chloride (50% in silicone fluid) | 2.0 | — | — | — |
| Azodicarbonamide | — | 1.0 | — | — |
| p,p'-oxybis(benzenesulfonyl-hydrazide) | — | — | 1.0 | — |
| 5-phenyltetrazole | — | — | — | 1.0 |
| Density (lbs/ft$^3$) | 33.2 | 40.0 | 41.2 | 44.6 |

[a]2,4-dichlorobenzoyl peroxide from Pennwalt Corp.
[b]mixture of Essential Oils from R. T. Vanderbilt Co., Inc.

With the composition of the present invention a lower density sponge was obtained illustrating greater efficiency. A fine uniform cellular structure was obtained in each case.

EXAMPLE 4

This example illustrates the comparison of gas-generating compositions of the present invention to a prior art blowing agent to produce a crosslinked EPDM free rise sponge. The standard mixing procedure was followed using a mixing speed of 30 rpm. The free rise sponge was produced by putting a 1"×1"×0.20" sample of the compounded composition in a hot air oven at 171° C. for 15 mins. and allowing the sample to rise and cure with no shaping or pressure.

TABLE IV

| Compositions | (Parts by Weight) | |
|---|---|---|
| | A | B |
| Polysar 585 EPDM[a] | 100 | 100 |
| N-330[b] | 40 | 40 |

TABLE IV-continued

| Compositions | (Parts by Weight) | |
|---|---|---|
| | A | B |
| Atomite 319 | 60 | 60 |
| Sunpar 2280[c] | 32 | 32 |
| ZnO | 3.0 | 3.0 |
| Luperco 500-40KE[d] | 5.0 | 5.0 |
| t-Butylhydrazinium chloride | 3.0 | — |
| Azodicarbonamide | — | 3.0 |
| Density (lbs/ft$^3$) | 22.7 | 25.5 |

[a]ethylene-propylene-diene rubber with a specific gravity of 0.86 and a Mooney Viscosity (ML1 + 8(100° C.)) of 49-61 from Polysar Inc.
[b]HAF carbon black from Ashland Chemical Co.
[c]paraffinic oil from Sun Refining and Marketing Co.
[d]40% dicumyl peroxide on Burgess KE clay from Pennwalt Corp.

The sponge produced from the composition of the present invention (column A) yielded a lower density than did the azodicarbonamide composition (column B). Moreover, the sponge from the present invention upon visual inspection, had a fine cellular structure while that produced from a prior art method, resulted in coarse, irregular cellular structure.

EXAMPLE 5

This example illustrates the use of a gas generating composition of the present invention in producing a crosslinked sponge based on a EPDM and silicone rubber blend. The standard mixing and sponge producing procedures were followed. The mixing speed was 30 rpm, the cure temperature was 143° C. and the cure time was 20 minutes.

TABLE V

| Composition | (Parts by Weight) | |
|---|---|---|
| | A | B |
| Polysar 585 EPDM | 50 | 50 |
| VL-540 Silicone Rubber[a] | 50 | 50 |
| N-330 | 30 | 30 |
| Santicizer 711[b] | 10 | 10 |
| Luperco 231-XL | 7 | 7 |
| t-Butylhydrazinium chloride (55% in Santicizer 711) | — | 3.64 |
| Density (lb/ft$^3$) | 52.3 | 40.3 |

[a]type:PMQ(ASTM D-1418), with a specific gravity of 1.20 ± 0.03, from General Electric Corp.
[b]linear phthalate ester plasticizer from Monsanto Industrial Chemical Co.

The composition of the present invention (Column B) obtained a sponge with low density and, upon visual inspection, a fine uniform cellular structure.

EXAMPLE 6

This example illustrates the effect of an auxiliary additive (zinc oxide) on crosslinked/foamed compositions of the present invention. This example uses a silicone rubber based composition. The standard mixing and sponge producing procedures were followed. The mixing speed was 50 rpm. The cure time was 15 mins. and the cure temperature was 177° C.

TABLE VI

| Compositions | (Parts by Weight) | |
|---|---|---|
| | A | B |
| SPG-30 Silicone Rubber | 100 | 100 |
| Hi-Sil 233 | 3.0 | 3.0 |
| Luperox 500R | 2.02 | 2.02 |
| Luperco CST | 1.0 | 1.0 |
| Rodo No. 10 | 0.1 | 0.1 |
| ZnO | — | 0.5 |
| t-Butylhydrazinium chloride (50% in Silicone Fluid) | 1.0 | 1.0 |

TABLE VI-continued

| Compositions | (Parts by Weight) | |
|---|---|---|
| | A | B |
| Density (lbs/ft³) | 34.0 | 25.9 |

From the above results metal oxides such as zinc oxide can be added to the composition of the present invention to obtain low sponge density (increased foaming efficiency).

EXAMPLE 7

This example illustrates the effectiveness of various t-alkylhydrazinium salts in combination with an organic peroxide in producing a crosslinked EPDM sponge. The mixing speed was 30 rpm. The standard mixing procedure was followed. The sponge producing procedure was to use enough of the specific compounded composition to press out, at 143° C. in a Carver Laboratory Press (Model C), a thin 3.375"×3.375" sheet. The molding pressure was held for 20 seconds. The pressure was then released and the sheet was removed and placed in a circulating air over for 20–26 minutes at 143° C. to rise and cure.

TABLE VII

| Compositions | Parts by Weight | | |
|---|---|---|---|
| | A | B | C |
| Polysar 346 EPDM | 100 | 100 | 100 |
| N-330 | 40 | 40 | 40 |
| Atomite 319 | 70 | 70 | 70 |
| Sunpar 2280 | 35 | 35 | 35 |
| Luperco 231-XL | 8 | 8 | 8 |
| Di-t-butylhydrazinium sulfate | — | 2.0 | — |
| t-Amylhydrazinium chloride | — | — | 2.0 |
| Density (lbs/ft³) | 97.0 | 34.8 | 40.1 |

The specific t-alkylhydrazinium salts in this example influence the final sponge density.

EXAMPLE 8

This example illustrates the effectiveness of various carbonylhydrazines in combination with an organic peroxide in producing a crosslinked EPDM sponge. The mixing speed was 30 rpm. The standard mixing procedure was followed. The sponge producing procedure was to use enough of the specific compounded composition to press out, at 143° C. in a Carver Laboratory Press (Model C), a thin 3.375" sheet. The molding pressure was held for 20 seconds. The pressure was then released and the sheet was removed and placed in a circulating air oven for 20–26 minutes at 143° C. to rise and cure.

TABLE VIII

| Compositions | Parts by Weight | | | | | |
|---|---|---|---|---|---|---|
| | A | B | C | D | E | F |
| Polysar 346 EPDM | 100 | 100 | 100 | 100 | 100 | 100 |
| N-330 | 40 | 40 | 40 | 40 | 40 | 40 |
| Atomite 319 | 70 | 70 | 70 | 70 | 70 | 70 |
| Sunpar 2280 | 35 | 35 | 35 | 35 | 35 | 35 |
| Luperco 231-XL | 8 | 8 | 8 | 8 | 8 | 8 |
| Ethylcarbazate | — | 2.0 | — | — | — | — |
| Carbohydrazide | — | — | 2.0 | — | — | — |
| Acethydrazide | — | — | — | 2.0 | — | — |
| Toluic acid hydrazide | — | — | — | — | 2.0 | — |
| Succinic acid hydrazide | — | — | — | — | — | 2.0 |
| Density (lb/ft³) | 97.0 | 34.7 | 36.1 | 41.3 | 39.1 | 37.6 |

The specific carbonylhydrazines in this example influence the final sponge density.

EXAMPLE 9

This example illustrates the effectiveness of t-butylhydrazinium chloride in combination with an organic peroxide in producing a crosslinked linear low density polyethylene foam. The Brabender Plastograph was preheated to 120° and a mixing speed of 50 rpm was used in the standard mixing procedure. The foam procedure was to use enough of the specific compounded composition to fill a 3.375"×3.375"×0.375" mold. The mold was preheated to 185° C. and the sample was then inserted. A thin metal cover was then placed over the mold and the mold inserted into a preheated (185° C.) Carver Laboratory press (Model C). Moderate pressure was then applied for three (3) minutes at which time the pressure was released and the press opened to a span of 0.25". The composition was then allowed to simultaneously rise and cure for an additional seven (7) minutes. Cooling water was then applied to rapidly cool down the press to approximately 38° C. at which time the foam sample was removed.

TABLE IX

| Composition | Parts by Weight | | |
|---|---|---|---|
| | A | B | C |
| XF-419[a] | 100 | 100 | 100 |
| ZnO | 1.0 | 1.0 | 1.0 |
| Luperco ® 101-XL[b] | — | 3.0 | 3.0 |
| t-Butylhydrazinium chloride | — | — | 1.0 |
| Density (lb/ft³) | 60.0 | 48.3 | 19.6 |

[a]Linear low density polyethylene resin with a specific gravity of 0.935 and a Melt Flow Index of 6.0 g/10 mins., from Soltex Polymer Corp.
[b]2,5-dimethyl-2,5-di(t-butylperoxy)hexane, 45% active on inert filler, from Pennwalt Corp.

EXAMPLE 10

This example illustrates the effectiveness of t-butylhydrazinium chloride in combination with an organic peroxide in producing a crosslinked ethylene-vinyl acetate foam. The Brabender Plastograph was preheated to 80° C. and a mixing speed of 50 rpm was used in the standard mixing procedure. The foam procedure was to use enough of the specific compounded composition to fill a 3.375"×3.375"×0.375" mold. The mold was preheated to 168° C. and the sample was then inserted. A thin metal cover was then placed over the mold and the mold was inserted into a preheated (168° C.) Carver Laboratory press (Model C). Slight pressure was then applied and the sample was allowed to expand to fill the mold and cure for 10 minutes. Cooling water was then applied to rapidly cool the press down to approximately 38° C. The pressure was then released and the sample foam was removed.

TABLE X

| Compositions | Parts by Weight | | |
|---|---|---|---|
| | A | B | C |
| UE-630[a] | 100 | 100 | 100 |
| HiSil 233 | 3.0 | 3.0 | 3.0 |
| ZnO | 1.0 | 1.0 | 1.0 |
| Luperco ® 230-XL[b] | — | 3.0 | 3.0 |
| t-Butylhydrazinium chloride | — | — | 3.0 |
| Density (lb/ft³) | 58.0 | 53.0 | 28.6 |

[a]Ethylene-vinyl acetate resin with a vinyl acetate content of 18%, specific gravity of 0.937 and a Melt Flow of 1.5 6/10 mins., from U.S.I. Chemicals, Co.
[b]n-Butyl 4,4-bis(t-butylperoxy)valerate, 40% active on inert filler, from Pennwalt Corp.

EXAMPLE 11

This example illustrates the effectiveness of t-butylhydrazinium chloride in combination with an organic peroxide in producing a crosslinked low density polyethylene foam. The Brabender Plastograph was preheated to 120° C. and a mixing speed of 50 rpm was utilized in the standard mixing procedure. The foam procedure was to use enough of the specific compounded composition to fill a 3.375"×3.375"×0.375" mold. The mold was preheated to 185° C. and the sample was then inserted. A thin metal cover was then placed over the mold and the mold was inserted into a preheated 185° C. Carver Laboratory press (Model C). Moderate pressure was then applied for three (3) minutes at which time the pressure was released and the press opened to a span of 0.25". The composition was then allowed to simultaneously rise and cure for an additional seven (7) minutes. Cooling water was then applied to rapidly cool down the press to approximately 38° C. at which time the foam sample was removed.

TABLE XI

| Compositions | Parts by Weight | | |
|---|---|---|---|
| | A | B | C |
| PE-102[a] | 100 | 100 | 100 |
| ZnO | 1.0 | 1.0 | 1.0 |
| Luperco 101-XL | — | 3.0 | 3.0 |
| t-Butylhydrazinium chloride | — | 1.0 | — |
| Azodicarbonamide | — | — | 2.0 |
| Density (lbs/ft$^3$) | 57.2 | 19.0 | 28.5 |

[a]Low density polyethylene resin with a specific gravity of 0.921 and a Melt Flow Index of 1.0 g/10 mins., from Rexene Polyolefins Co.

The composition of the present invention (column B) obtained a crosslinked foam with a fine uniform cellular structure. Moreover the density reduction obtained was much higher than the prior art method (column C). This enhanced efficiency obtained with the compositions of the present invention was possibly due to the crosslinking/foaming reactions not being independent of each other as was the case in the prior art methods.

EXAMPLE 12

This example illustrates the use of t-butylhydrazinium chloride in combination with an organic peroxide in producing a crosslinked EPM sponge. The mixing speed was 30 rpm and the cure temperature and cure time were 171° C. and 15 mins., respectively. The standard mixing and sponge producing procedures were followed.

TABLE XII

| Compositions | Parts by Weight | |
|---|---|---|
| | A | B |
| Polysar ® EPM 306[a] | 100 | 100 |
| N-660[b] | 40 | 40 |
| Atomite 319 | 70 | 70 |
| Sunpar 2280 | 50 | 50 |
| ZnO | 2.5 | 2.5 |
| TAIC[c] | 4.0 | 4.0 |
| Luperco ® 500-40KE | 7.0 | 7.0 |
| t-Butylhydrazinium chloride | — | 2.5 |
| Density (lbs/ft$^3$) | 74.3 | 29.2 |

[a]Ethylene-propylene copolymer (EPM) with a specific gravity of 0.86 and a Mooney Viscosity (ML 1 + 8(100° C.)) of 30–42, from Polysar Inc.
[b]GPF carbon black, from Ashland Chemical Co.
[c]Triallyl isocyanurate, from Mitsubishi International Corp.

The composition of the present invention (column B) obtained a sponge with low density and, upon visual inspection, a fine uniform cellular structure.

EXAMPLE 13

This example illustrates the effectiveness of t-butylhydrazinium chloride in combination with an organic peroxide in producing a crosslinked high density polyethylene foam. The Brabender Plastograph was preheated to 140° C. and a mixing speed of 50 rpm was utilized in the standard mixing procedure. The foam procedure was to use enough of the specific compounded composition to fill a 3.375"×3.375"×0.375" mold. The mold was preheated to 204° C. and the sample was then inserted. A thin metal cover was then placed over the mold and the mold was inserted into a preheated (204° C.) Carver Laboratory press (Model C). Moderate pressure was then applied for three (3) minutes at which time the pressure was released and the press opened to a span of 0.25". The composition was then allowed to simultaneously rise and cure for an additional twelve (12) minutes. Cooling water was then applied to rapidly cool down the press to approximately 38° C. at which time the foam sample was removed.

TABLE XIII

| Composition | Parts by Weight | | |
|---|---|---|---|
| | A | B | C |
| DEMD-8007[a] (HDPE) | 100 | 100 | 100 |
| Luperco ® 130-XL[b] | — | 3.0 | 3.0 |
| DLTDP[c] | — | 0.1 | 0.1 |
| t-Butylhydrazinium chloride | — | — | 1.0 |
| Density (lbs/ft$^3$) | 59.2 | 49.3 | 19.5 |

[a]High density polyethylene resin with a specific gravity of 0.965 and a Melt Flow Index of 7.5 g/10 mins, from Union Carbide Corp.
[b]2,5-dimethyl-2,5-di(t-butylperoxy)hexyne-3, 45% active on inert filler, from Pennwalt Corp.
[c]Dilauroyl thiodipropionate, from Witco Chemical Co.

Using the compositions of the present invention (column C) significant density reduction was obtained. The resulting foam (upon visual inspection) had a fine uniform cellular structure. On the other hand the prior art method (column B) had some density reduction; however, upon visual inspection the sample contained random voids and thus would not be commercially acceptable.

EXAMPLE 14

This example illustrates the use of t-butylhydrazinium chloride in combination with an organic peroxide in producing a crosslinked chlorinated polyethylene sponge. The mixing speed was 30 rpm and the mixer was preheated to 60° C. The cure temperature and cure time were 160° C. and 15 min., respectively. The standard mixing and sponge procedures were followed.

TABLE XIV

| Composition | Parts by Weight | |
|---|---|---|
| | A | B |
| CMO136[a] | 100 | 100 |
| MgO | 15 | 15 |
| N-774[b] | 45 | 45 |
| Santicizer 711 | 35 | 35 |
| TATM[c] | 4 | 4 |
| Luperco ® 233-XL[d] | 8 | 8 |
| t-Butylhydrazinium chloride | — | 2.5 |
| Density (lbs/ft$^3$) | 81.0 | 50.6 |

[a]Chlorinated polyethylene with a specific gravity of 1.16 Mooney Viscosity (ML 1 + 4(250° F.)) of 38 and a chlorine content of 36%, from Dow Chemical Co.
[b]SRF-HS Carbon black, from Ashland Chemical Co.
[c]Triallyl trimellitate, from R. T. Vanderbilt Co., Inc.
[d]Ethyl 3,3-di(t-butylperoxy)butyrate 40% active on inert filler, from Pennwalt Corp.

The composition of the present invention (column B) obtained a sponge with low density and, upon visual inspection, a fine uniform cellular structure.

EXAMPLE 15

This example illustrates the use of t-butylhydrazinium chloride with an organic peroxide in producing a crosslinked fluoroelastomer sponge. The standard mixing procedure was followed using a mixing speed of 30 rpm. The free rise sponge was produced by putting a 1"×1"×0.20" sample of the compounded composition in a hot air oven at 171° C. for 20 mins. and allowing the sample to simultaneously rise and cure with no shaping or pressure.

TABLE XV

| Composition | Parts by Weight A |
|---|---|
| FC 2480$^a$ | 100 |
| N-990 | 20 |
| Ca(OH)$_2$ | 3.0 |
| ZnO | 1.5 |
| TAIC | 5.0 |
| Santicizer 711 | 2.0 |
| LUPERCO 101-XL | 2.5 |
| t-Butyl hydrazinium chloride | 1.5 |
| Density (lbs./ft$^3$) | 49 |

$^a$Fluoroelastomer with a specific gravity of 1.80, Mooney Viscosity (ML(1 + 10)@250° F.) of 80 and a fluorine content of 65%, from 3M.

The free rise sponge using the composition of the present invention had a fine uniform cellular structure upon visual inspection.

EXAMPLE 16

This example illustrates the use of a crosslinkable/-foamable composition of the present invention with an auxiliary commercial chemical blowing agent to produce a crosslinked EPDM sponge. The mixing speed was 30 rpm. The standard mixing procedure and sponge producing procedures were followed. The cure temperature and cure time were 149° C. and 15 minutes, respectively.

TABLE XVI

| Composition | Parts by Weight |
|---|---|
| Polysar 585 EPDM | 100 |
| N-330 | 40 |
| Atomite 319 | 40 |
| Sunpar 2280 | 40 |
| ZnO | 1 |
| LUPERCO 231-XL | 7 |
| t-Butylhydrazinium chloride | 1 |

TABLE XVI-continued

| Composition | Parts by Weight |
|---|---|
| p-Toluenesulfonylhydrazide | 1 |
| Density (lbs./ft$^3$). | 27.4 |

What is claimed is:

1. A foamable and crosslinkable composition consisting essentially of a crosslinkable thermoplastic and/or elastomeric polymer selected from the group of ethylene-propylene-diene rubber, silicone rubber, polyethylene resin, ethylene-vinyl acetate resin, ethylene-propylene copolymer, chlorinated polyethylene, fluoroelastomer, nitrile rubber, and blends thereof, at least one free radical initiator which is activated at temperatures from about 50° C. to about 350° C., a compound selected from a t-alkylhydrazinium salt or a carbonylhydrazine, and optionally an auxiliary blowing agent.

2. The composition of claim 1 wherein the compound is selected from t-butylhydrazinium chloride, di-t-butylhydrazinium sulfate, t-amylhydrazinium chloride, carbohydrazide, ethylcarbazate, acetylhydrazide, toluic acid hydrazide, and succinic acid hydrazide.

3. The composition of claim 2 wherein the free radical initiator is selectd from 1,1-bis(t-butylperoxy)-3,3,5-trimethylcyclohexane dicumyl peroxide, 2,5-dimethyl-2,5-di-(t-butyl-peroxy)hexane, and 2,4-dichlorobenzoyl peroxide, n-butyl 4,4-bis(t-butylperoxy)valerate, 2,5-dimethyl-2,5-di(t-butylperoxy)hexyne-3, ethyl 3,3-di(t-butylperoxy)butyrate, 1,1-bis(t-butylperoxy)cyclohexane, t-butyl cumyl peroxide, α,α'-di[(t-butylperoxy)isopropyl]benzene, and mixtures thereof.

4. The composition of claim 3 wherein a filler, antioxidant, stabilizer, plasticizer, processing oil, or processing aid is present.

5. The composition of claim 4 wherein the filler present is selected from carbon black, calcium carbonate, silica powder, and zinc oxide.

6. The composition of claim 1 wherein the concentration of the crosslinkable thermoplastic and/or elastomeric polymer is 100 parts, the free radical initiator is from 0.1 to 10 parts, and the compound is from about 0.1 to 20 parts.

7. The composition of claim 6 wherein the auxiliary blowing agent is selected from azodicarbonamide, p-toluenesulfonylhydrazide, 4,4-oxybis(benzenesulfonylhydrazide), dinitrosopentamethylenetetramine, and 5-phenyltetrazole.

8. A method of foaming and crosslinking the composition of claim 1 comprising reacting said composition in a temperature range of from about 50° C. to about 350° C. until foaming and crosslinking have been effected.

* * * * *